(12) United States Patent
Abe

(10) Patent No.: US 11,955,628 B2
(45) Date of Patent: Apr. 9, 2024

(54) METHOD OF PRODUCING GUEST-FREE SILICON CLATHRATE, APPARATUS FOR PRODUCING GUEST-FREE SILICON CLATHRATE

(71) Applicant: TOYOTA JIDOSHA KABUSHIKI KAISHA, Toyota (JP)

(72) Inventor: Nobuhira Abe, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/729,725

(22) Filed: Apr. 26, 2022

(65) Prior Publication Data

US 2022/0393159 A1 Dec. 8, 2022

(30) Foreign Application Priority Data

Jun. 4, 2021 (JP) ................. 2021-094096

(51) Int. Cl.
  *H01M 4/38* (2006.01)
  *B01J 19/12* (2006.01)
  *B01J 19/28* (2006.01)
  *C01B 33/037* (2006.01)

(52) U.S. Cl.
  CPC ........... *H01M 4/386* (2013.01); *B01J 19/122* (2013.01); *B01J 19/28* (2013.01); *C01B 33/037* (2013.01); *B01J 2219/1203* (2013.01); *C01P 2006/40* (2013.01)

(58) Field of Classification Search
  CPC .. B01J 19/122; B01J 19/28; B01J 2219/1203; C01B 33/037; C01B 33/02; C01B 33/06; C01B 33/021; C01P 2006/40; H01M 4/62; H01M 10/0525
  See application file for complete search history.

(56) References Cited

U.S. PATENT DOCUMENTS

| | | |
|---|---|---|
| 6,402,774 B1 | 6/2002 | Caldironi |
| 6,423,286 B1 | 7/2002 | Gryko |
| 8,968,929 B2 | 3/2015 | Chan et al. |

(Continued)

FOREIGN PATENT DOCUMENTS

| | | |
|---|---|---|
| CN | 104105239 A | 10/2014 |
| JP | 3075306 U | 2/2001 |

(Continued)

OTHER PUBLICATIONS

Dopika et al. Adv Energy and Sustain Res—2021 (Year: 2021).*
Dopika et al. Adv Energy and Sustain Res—2021 Supporting Information (Year: 2021).*
Office Action dated Apr. 17, 2023 by the United States Patent and Trademark Office in U.S. Appl. No. 17/329,480.

(Continued)

*Primary Examiner* — Samir Shah
*Assistant Examiner* — Jordan W Taylor
(74) *Attorney, Agent, or Firm* — Sughrue Mion, PLLC

(57) ABSTRACT

[Problem] To improve productivity of guest-free silicon clathrates

[Solution] A method of producing a guest-free silicon clathrate includes a synthesizing step of performing a heat treatment on a mixture containing Si as a material serving as a host and a material serving as a guest to synthesize a silicon clathrate compound; and a guest removing step of irradiating the silicon clathrate compound contained in a container with an electromagnetic wave to remove the guest while suctioning gas inside the container.

2 Claims, 17 Drawing Sheets

(56) References Cited

U.S. PATENT DOCUMENTS

| | | | |
|---|---|---|---|
| 11,088,367 B2 | 8/2021 | Kosaka et al. | |
| 11,600,817 B2 | 3/2023 | Harata et al. | |
| 2008/0253955 A1* | 10/2008 | Leblanc | F27B 7/2083 |
| | | | 423/350 |
| 2012/0021283 A1 | 1/2012 | Chan et al. | |
| 2015/0243986 A1 | 8/2015 | Negi et al. | |
| 2015/0376016 A1 | 12/2015 | Krishna et al. | |
| 2015/0380724 A1 | 12/2015 | Chan | |
| 2016/0176716 A1 | 1/2016 | Strobel et al. | |
| 2020/0020929 A1 | 1/2020 | Yoshida et al. | |
| 2020/0176768 A1 | 7/2020 | Kosaka et al. | |
| 2021/0020938 A1 | 1/2021 | Yamaguchi et al. | |
| 2021/0066714 A1 | 3/2021 | Harata et al. | |
| 2021/0384498 A1 | 12/2021 | Suzuki et al. | |
| 2023/0086351 A1 | 3/2023 | Harata et al. | |

FOREIGN PATENT DOCUMENTS

| | | |
|---|---|---|
| JP | 2006-041134 A | 2/2006 |
| JP | 2012-140266 A | 7/2012 |
| JP | 2012-224488 A | 11/2012 |
| JP | 2013-18679 A | 1/2013 |
| JP | 2020-017513 A | 1/2020 |
| JP | 2020-87886 A | 6/2020 |
| JP | 2021-31349 A | 3/2021 |
| KR | 10-2009-0053807 A | 5/2009 |
| WO | 2014/050100 A1 | 4/2014 |

OTHER PUBLICATIONS

Office Action dated Jun. 29, 2022 by the United States Patent and Trademark Office in U.S. Appl. No. 17/002,408.

Office Action dated Oct. 14, 2020 by the United States Patent and Trademark Office in U.S. Appl. No. 16/594,094.

Horie et al., "Controlled thermal decomposition of NaSi to derive silicon clathrate compounds", Journal of Solid State Chemistry, 2009, vol. 182, pp. 129-135 (7 pages total).

Krishna et al., "Group IV clathrates: synthesis, optoelectronic properties, and photovoltaic applications", CrystEngComm, 2014, vol. 16 (11 pages total).

Cerqueira et al., "Prediction and Synthesis of a Non-Zintl Silicon Clathrate", Chemistry of Metals, 2016, vol. 28, pp. 3711-3717 (7 pages total).

Langer et al., "Electrochemical Lithiation of Silicon Clathrate-II", Journal of the Electrochemical Society, 2012, vol. 159, No. 8, pp. A1318-A1322 (5 pages total).

Boheme et al., "Oxidation of M4Si4 (M=Na, K) to Clathrates by HCI or H2O", J. Am. Chem. Soc., 2007, vol. 129, pp. 5348-5349 (2 pages total).

Krishna et al., "Efficient route to phase selective synthesis of type II silicon clathrates with low sodium occupancy" CrystEngComm, 2014 pp. 3940-3949 (10 pages total).

Li et al., "Type 1 Clathrates as Novel Silicon Anodes: An Electrochemical and Structural Investigation", Adv. Sci., 2015, vol. 2, No. 6 (12 pages total).

Wagner et al., "Electrochemical Cycling of Sodium-Filled Silicon Clathrate", ChemElectroChem, 2014, vol. 1, pp. 347-353 (7 pages total).

* cited by examiner

METHOD OF PRODUCING GUEST-FREE SILICON CLATHRATE, APPARATUS FOR PRODUCING GUEST-FREE SILICON CLATHRATE

TECHNICAL FIELD

The present disclosure relates to a guest-free silicon clathrate.

BACKGROUND

Patent Document 1 discloses a method of producing a guest-free silicon clathrate. The method includes a first heat treatment step of performing a heat treatment on a mixture containing Si particles and Na alone and synthesizing a NaSi compound having a Zintl phase, and a second heat treatment step of performing a heat treatment on the NaSi compound under reduced pressure to remove Na.

Patent Document 2 discloses an apparatus for producing a carbon nanotube. In the apparatus, a workpiece is placed on a swinging tool in a stationary furnace and heated by a heater from outside the furnace while the gas is discharged.

Patent Document 3 discloses a method of producing a laminated ceramic electronic component in which a workpiece is placed on a rotary table in a stationary furnace and heated using a microwave while vacuum suction is performed.

PRIOR ART DOCUMENTS

Patent Document

Patent Literature 1: JP2020-017513A
Patent Literature 2: JP2012-140266A
Patent Literature 3: JP2006-041134A

SUMMARY OF THE INVENTION

Problem to be Solved by the Invention

Conventionally, removal of Na, which is a guest, is not promoted in the production of guest-free silicon clathrates, and there has been a problem in improving productivity.

In view of the above problem, it is an object of the present disclosure to provide a method of producing a guest-free silicon clathrate capable of improving productivity. Further, a producing apparatus for the same is provided.

Means for Solving the Problem

The inventor has intensively studied using Si as a host and Na as a guest as an example and has obtained a finding that the removal of Na is not promoted because heat is hardly sufficiently transferred simply by irradiating a heater under reduced pressure when Na as a guest is removed from a NaSi compound as a silicon clathrate. It was also found that the removed Na remained in the gas, on a wall surface of a container, and on a surface of material, which was one of causes of a long treatment time. Based on these findings, the problem was solved as follows.

As one aspect, the present application discloses a method of producing a guest-free silicon clathrate. The method includes: a synthesizing step of performing a heat treatment on a mixture containing Si as a material serving as a host and a material serving as a guest to synthesize a silicon clathrate compound; and a guest removing step of irradiating the silicon clathrate compound contained in a container with an electromagnetic wave to remove the guest while suctioning the gas inside the container.

This allows increasing the productivity of the guest-free silicon clathrate.

The guest removing step may be performed while rotating the container. This allows further increasing the productivity by heating with high uniformity.

The method may further include: mixing the silicon clathrate compound and a Li source after the synthesizing step and synthesizing a silicon clathrate compound containing Li; forming voids by removing Li from the silicon clathrate compound containing Li to obtain a silicon clathrate compound having the voids; and performing the guest removing step on the silicon clathrate compound having the voids.

This allows enhancing the productivity of the guest-free silicon clathrate having the voids.

As another aspect, the present application discloses an apparatus for producing a guest-free silicon clathrate by removing a guest from a silicon clathrate compound contained in a container. The apparatus includes: an electromagnetic wave irradiator that irradiates the container with an electromagnetic wave; and a suction device capable of suctioning the gas in the container from the container while performing electromagnetic wave irradiation by the electromagnetic wave irradiator.

Further, it may be an apparatus for producing a guest-free silicon clathrate configured to have a rotary shaft that rotatably holds the container.

Effect of the Invention

The present disclosure allows the efficient removal of a guest from a silicon clathrate and the increased productivity of a guest-free silicon clathrate.

EMBODIMENT FOR IMPLEMENTING THE INVENTION

1. Guest-Free Silicon Clathrate

A guest-free silicon clathrate will be described first. A guest-free silicon clathrate can be produced by a producing method and a producing apparatus of the present disclosure.

As is known, a silicon clathrate is one in which a guest material (in this embodiment, Na is used as a guest) is arranged inside a cage-like skeleton structure formed by bonding of Si as a host. The guest-free silicon clathrate is a material in which the guest is removed from the silicon clathrate while the cage-like skeleton structure by Si remains. That is, guest-free silicon clathrates have a structure in which a bond distance between Si is larger than that in the structure by bonding of ordinary Si.

When such a guest-free silicon clathrate is used, for example, as a negative electrode material of a lithium ion battery, the distance between Si is large, and Li in movement during charging and discharging of the battery hardly breaks a bond between Si, thus allowing the reduced expansion of the negative electrode to suppress a defect such as cracking of the negative electrode. When a material having a structure by the bonding of ordinary Si is used for the negative electrode, since inter-Si is narrow, the bonding of Si is broken when Li ions move, which is one of causes of the expansion of the negative electrode.

Figure 1:
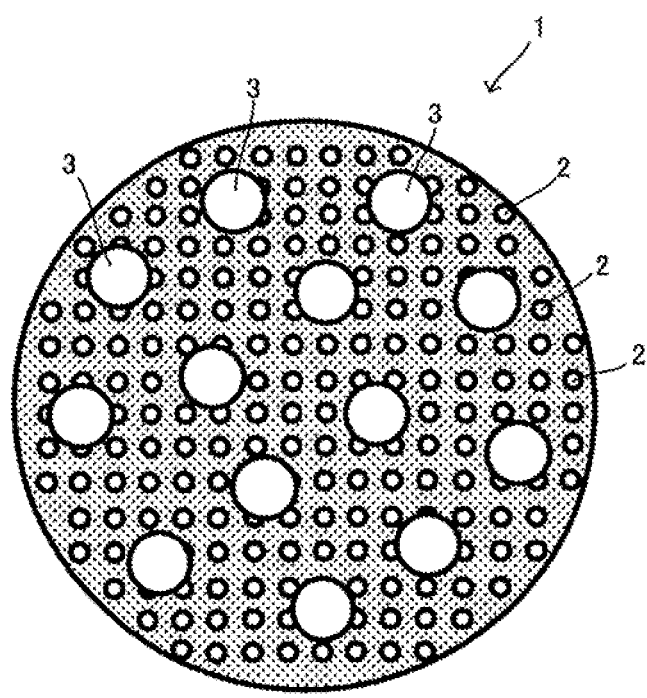
FIG. 1 is a diagram conceptually representing a configuration of a guest-free silicon clathrate 1.

FIG. 1 schematically depicts an aspect of a guest-free silicon clathrate 1 according to one embodiment. In this embodiment, the guest-free silicon clathrate 1 is a guest-free silicon clathrate and is further configured to have voids 3. The sites of the signs 2 shown as small circles in FIG. 1 represent sites where the guests are removed (hereinafter sometimes referred to as "guest removed site 2").

On the other hand, the void 3 represents a void formed independently of the cage-like skeleton structure by Si. Although a method of forming the voids 3 and the like will be described later, it is possible to absorb a change in volume of the guest-free silicon clathrate (the negative electrode) by these voids 3 and further suppress a defect such as cracking.

2. Method of Producing a Guest-Free Silicon Clathrate

Figure 2:
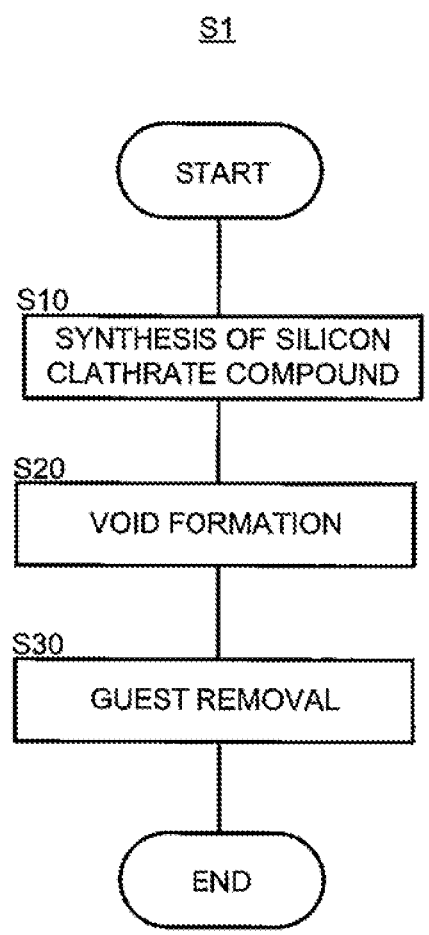
FIG. 2 is a diagram illustrating a flow of a method S1 of producing a guest-free silicon clathrate.

The guest-free silicon clathrate 1 described above can be produced through the following steps. FIG. 2 shows the flow. As can be seen from FIG. 2, a method S1 of producing a guest-free silicon clathrate includes Step S10 of synthesizing a silicon clathrate compound, Step S20 of forming the voids 3, and Step S30 of removing the guests. Hereinafter, each step will be described.

2.1. Synthesis of a Silicon Clathrate Compound (Step S10)

Step S10 of synthesizing a silicon clathrate compound (hereinafter sometimes referred to as "Step S10") is a step of synthesizing a silicon clathrate compound. In this embodiment, a silicon clathrate compound is prepared by having Si as a host and Na as a guest. Although a specific method of producing such a silicon clathrate is not particularly limited and is known, for example, it can be performed by mixing Si and Na at 1:1 and baked at a high temperature (e.g., 850° C.) to form $Na_1Si_1$, and then further baking it at a low temperature (e.g., 450° C.) to obtain $Na_{20}Si_{136}$. This obtains a silicon clathrate compound in which Na is disposed on at least a part of the inside of the cage-like skeleton structure by the bonding of Si. In other words, a material is obtained in which sites where the guests (Na) remain due to baking at a low temperature and the guest removed sites 2 where Na is removed are mixed.

2.2. Void formation (Step S20)

Figure 3:
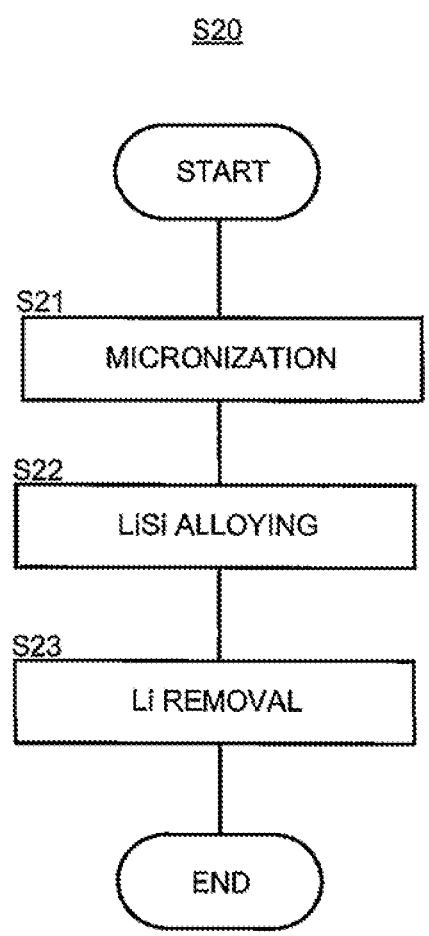
FIG. 3 is a diagram illustrating a flow of Step S20 of void formation.

Step S20 of forming the voids 3 (hereinafter sometimes referred to as "Step S20") forms the voids 3 within the silicon clathrate compound obtained in Step S10. FIG. 3 shows the flow of Step S20. As can be seen from FIG. 3, Step S20 includes micronization Step S21, LiSi alloying Step S22, and Li removing Step S23. Hereinafter, each step will be described.

In micronization Step S21, the silicon clathrate compound obtained in Step S10 is micronized by a ball mill or the like.

Figure 4:
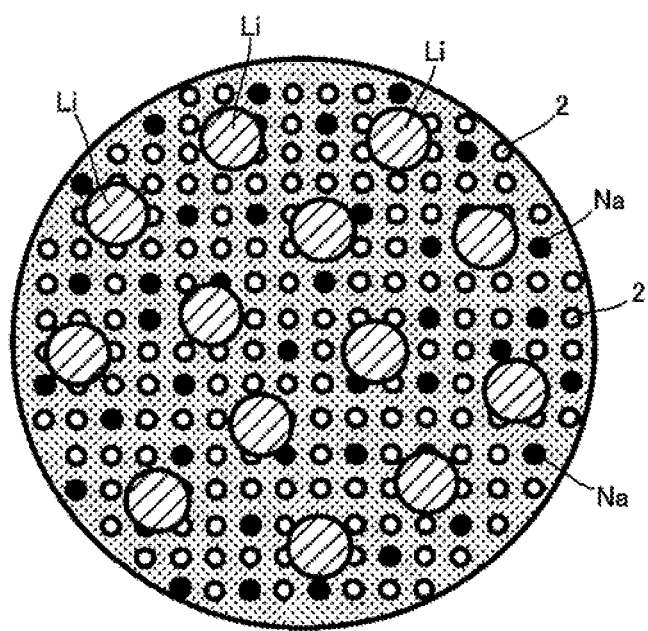
FIG. 4 is a diagram illustrating a silicon clathrate compound containing Li.

In LiSi alloying Step S22, the silicon clathrate compound micronized in micronization Step S21 and Li are mixed to produce a silicon clathrate compound containing Li as shown in FIG. 4. Although there is no particular limitation on a specific method, the micronized silicon clathrate compound and miniaturized Li foil are placed in a mortar or the like and mixed under an inert atmosphere (an Ar gas atmosphere or the like). Note that, at this time, mixing of Li is more stable when the sites where the guests (Na) remain and the guest removed sites 2 are mixed in the silicon clathrate compound as obtained in Step S10. On the other hand, in the absence of remaining guests (Na), the cage-like skeleton structure of Si tends to collapse.

Figure 5:
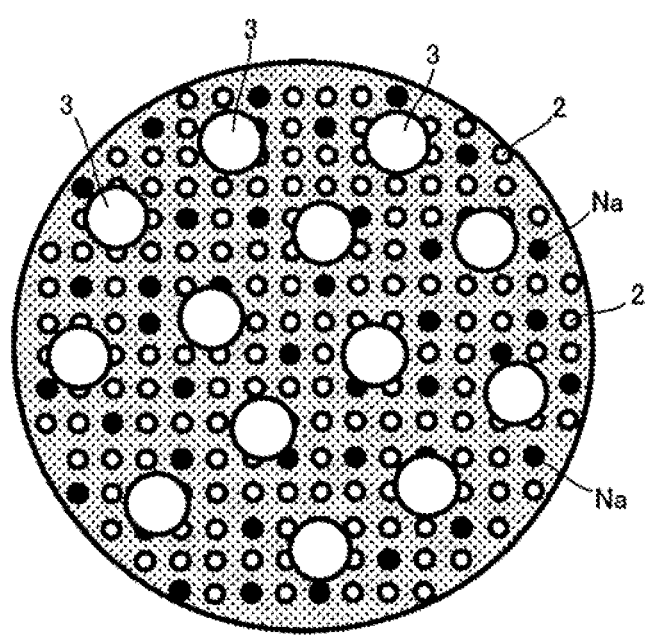
FIG. 5 is a diagram illustrating a silicon clathrate compound having voids 3 formed therein.

In Li removing Step S23, Li is removed from the silicon clathrate compound containing Li obtained in LiSi alloying Step S22 to obtain a silicon clathrate compound having the voids 3 as shown in FIG. 5. Although there is no particular limitation on a method of removing Li, there may be mentioned a method in which ethanol is put into a silicon clathrate compound containing Li suspended in a solvent, and Li is selectively removed by reacting Li with ethanol.

As described above, Step S20 allows, as shown in FIG. 5, obtaining a silicon clathrate compound in which the sites where the guests (Na) remain and the guest removed sites 2 where Na is removed are mixed, and the voids 3 are formed.

2.3. Guest Removal (Step S30)

The step of removing the guests (hereinafter sometimes referred to as "Step S30") causes the remaining guests (Na in this embodiment) to be removed from the silicon clathrate compound obtained in Step S20 (see FIG. 5).

The removal of Na as the guest is performed by heating. However, since it is necessary to put a material into a container under reduced pressure to prevent oxidation and heat it, conventionally there is a problem such as efficiency of heating and reattachment of the removed Na, and it is difficult to efficiently remove the guests. In contrast, in the present disclosure, it is possible to efficiently perform the removal of the guests by the apparatus and the producing method described later.

2.4. Supplementary Notes

The guest-free silicon clathrate 1 can be obtained by the producing method including the above-described Steps S10 to S30. Note that, in this embodiment, the guest-free silicon clathrate having the voids 3 has been described as an example, but even when a guest-free silicon clathrate having no void 3 is produced, it can be considered in the same manner by simply eliminating Step S20.

Hereinafter, an apparatus and a producing method for guest removal in Step S30 will be described.

3. Apparatus for Producing a Guest-Free Silicon Clathrate

Figure 6:
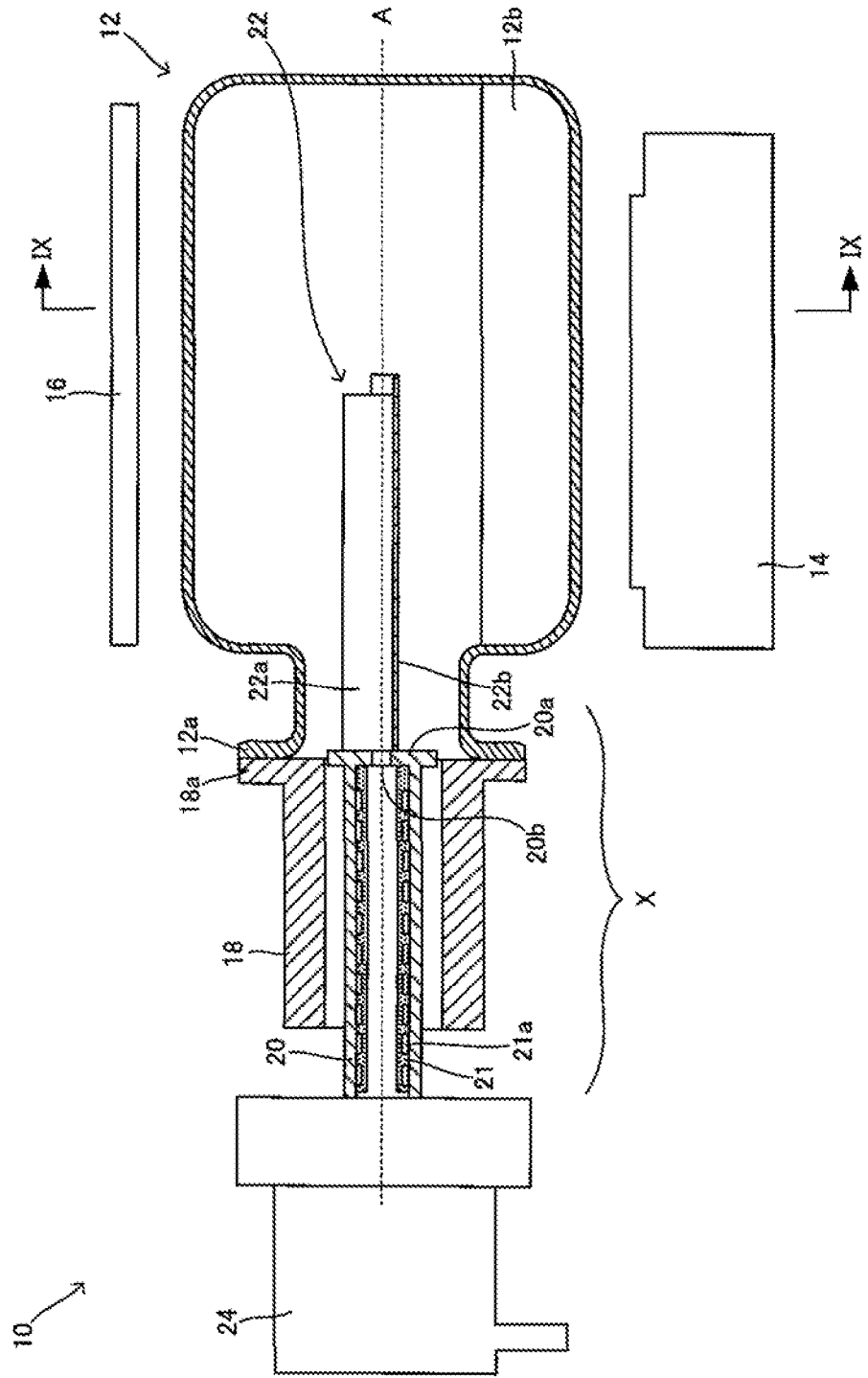
FIG. 6 is a diagram illustrating a configuration of a producing apparatus 10 for a guest-free silicon clathrate.

FIG. 6 to FIG. 11 illustrate an outline of a configuration of a guest-free silicon clathrate producing apparatus 10 (hereinafter sometimes referred to as "producing apparatus 10") for the guest removal in Step S30. Especially, FIG. 6 shows an overall configuration of the producing apparatus 10 (partially cross-sectional).

The producing apparatus 10 includes a container 12, electromagnetic wave irradiators 14, reflectors 16, a rotary shaft 18, a suction tube 20, a guest adsorber 22, and a suction device 24. Each configuration will be described below.

3.1. Container

Figure 7:
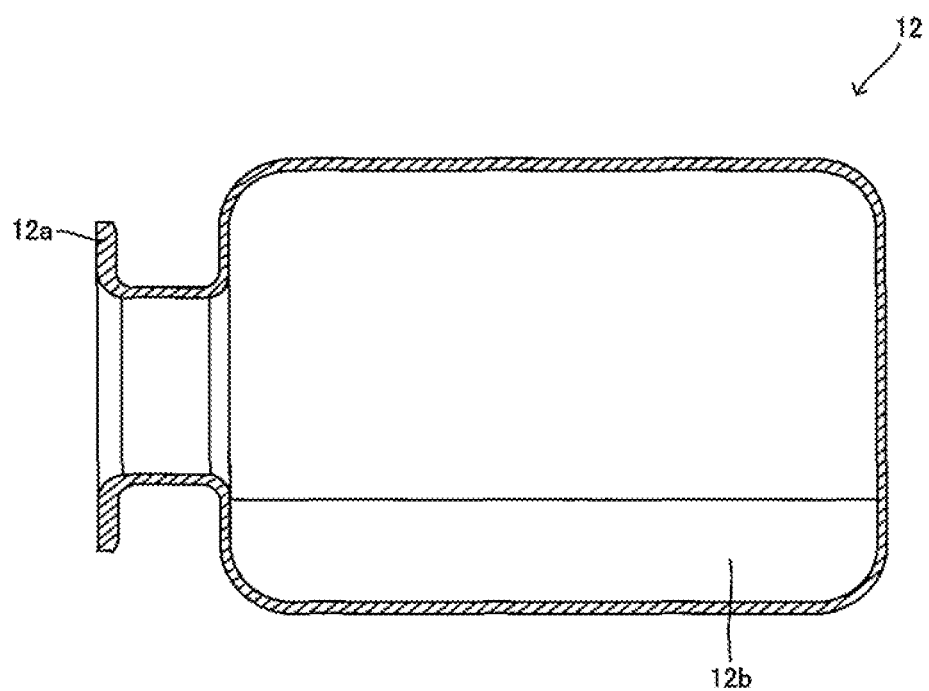
FIG. 7 is a diagram illustrating a container 12.
Figure 8:
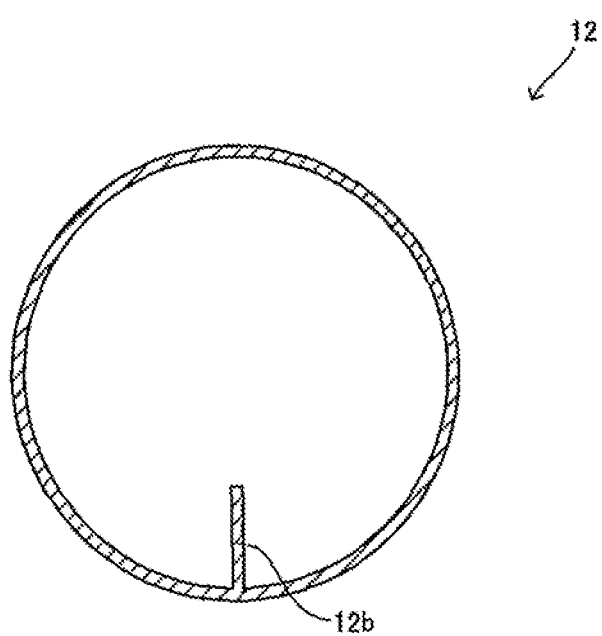
FIG. 8 is a diagram illustrating the container 12.

The container 12 is a container for storing a silicon clathrate compound which is produced in Step S20 and is an object from which a guest (Na) is removed. FIG. 7 and FIG. 8 represent only the container 12. In FIG. 6 and FIG. 7, a cross-section in a depth direction of the container 12 (a direction along an axis of the container 12 as a cylinder) appears. In FIG. 8, a cross section in a direction perpendicular to the depth direction of the container 12 (a direction along a radial direction of the container 12 as a cylinder) appears.

A specific embodiment of the container 12 only needs to be configured to store the silicon clathrate compound as an object, have durability to maintain its shape even when the inside thereof is depressurized (which is a pressure lower than atmospheric pressure, a condition close to a vacuum possible by a vacuum pump), and heat the silicon clathrate compound stored when irradiated with an electromagnetic wave from the outside of the container 12 by the electromagnetic wave irradiators 14. In this embodiment, as an embodiment, the following aspect is provided from the viewpoint that the guest can be removed more efficiently.

In this embodiment, the container 12 has a bottom on one side and a cylindrical shape with the other side open. Forming the cylindrical shape allows efficiently stirring a silicon clathrate compound when the container 12 is rotated about the axis as described later, and the occurrence of uneven heating can be suppressed when heating with an electromagnetic wave. Note that the container 12 has a reduced diameter at an opening side end and has a flange portion 12a at an opening. The container 12 is coupled to the rotary shaft 18 with the flange portion 12a as described later.

In this embodiment, the container 12 has a stirring plate 12b as a plate-like member which rises from an inner peripheral surface thereof toward the axis and is formed so as to extend in a direction parallel to the axis. Stirring of the silicon clathrate compound is efficiently performed by the stirring plate 12b, and uneven heating due to an electromagnetic wave can be reduced. In this embodiment, one stirring plate 12b is provided and is formed so as to rise from the inner peripheral surface of the container 12 toward the axis and extend in the direction parallel to the axis, but the number and shape of the stirring plate 12b are not particularly limited. In other words, any configuration can be adopted as long as it allows the silicon clathrate compound stored in the container 12 to be stirred by the stirring plate 12b with the rotation of the container 12, and the stirring plate 12b can be any member protruding from an inner wall surface of the container 12.

In addition, in this embodiment, the container 12 is made of quartz glass. Thus, it is possible to obtain heat resistance, and it is possible to allow the electromagnetic wave to efficiently penetrate into the interior because of high transparency. However, the material of the container is not limited thereto, and may be made of any other material.

3.2. Electromagnetic Wave Irradiator

The electromagnetic wave irradiator 14 is an apparatus for irradiating the inside of the container 12 with the electromagnetic wave. Here, the electromagnetic wave efficiently heats the silicon clathrate compound stored inside the container 12 in which media for transferring heat is extremely reduced by depressurizing. As long as the silicon clathrate compound in such an environment can be efficiently heated, there is no particular limitation on the type of specific electromagnetic wave, and examples thereof include electromagnetic waves having near infrared rays (a wavelength of about 0.7 µm to 2.5 µm). Thus, the silicon clathrate compound stored in the significantly depressurized container 12 can be efficiently heated.

As specific embodiments of the electromagnetic wave irradiator 14, known ones can be used in accordance with the electromagnetic wave to be emitted, and it is possible to apply a lamp heater (a halogen lamp) when emitting near-infrared rays.

The electromagnetic wave irradiator 14 may be arranged such that the electromagnetic wave reaches the inside of the container 12. Specific embodiments therefor are not particularly limited. In this embodiment, as can be seen from FIG. 6 and FIG. 9 (the IX-IX cross section of FIG. 6), a plurality of electromagnetic wave irradiators 14 are disposed along an outer periphery of the container 12. In this embodiment, one electromagnetic wave irradiator 14 extends in the direction parallel to the axis of the container 12, and for the direction, the one electromagnetic wave irradiator 14 is configured to irradiate the entire container 12 with the electromagnetic wave.

Figure 9:
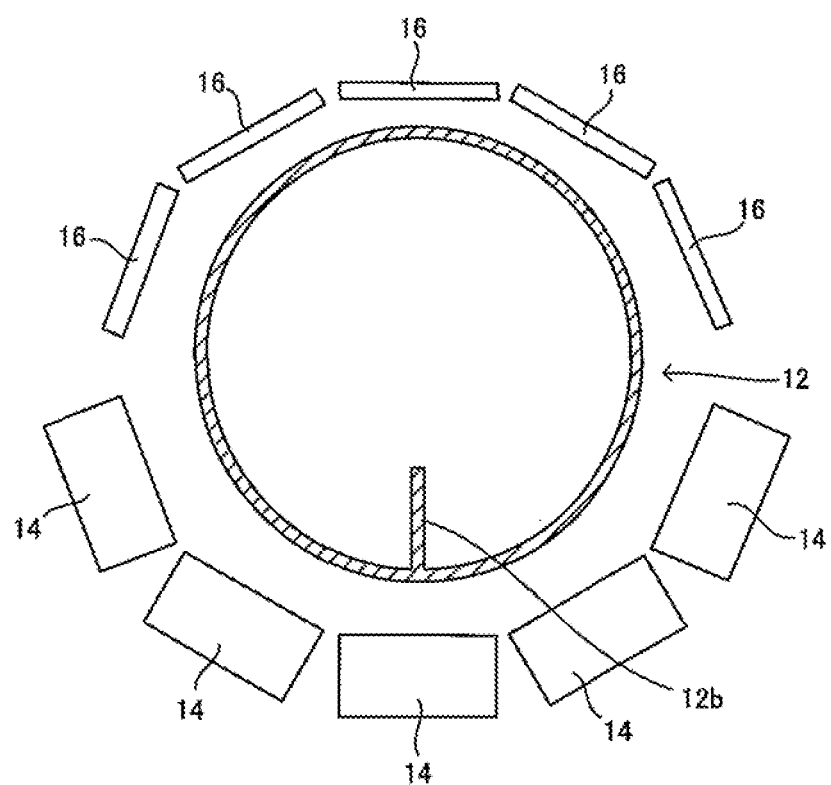
FIG. 9 is a diagram illustrating the container 12, electromagnetic wave irradiators 14, and reflectors 16 arranged around an outer peripheral portion of the container 12.

Further, in this embodiment, as can be seen from FIG. 9, the electromagnetic wave irradiators 14 are disposed in the lower half of the outer periphery of the container 12. This is because the reflectors 16 are disposed in the upper half of the outer periphery of the container 12 in this embodiment. The electromagnetic wave irradiators 14 may be disposed in the upper half instead of the reflectors 16 as described later, and in this case, the electromagnetic wave irradiators 14 are disposed over the entire periphery of the outer periphery of the container 12.

3.3. Reflector

The reflector 16 is an apparatus that reflects the electromagnetic wave emitted from an opposite outer peripheral portion of the container 12 through the container 12 as a part of the electromagnetic wave emitted from the electromagnetic wave irradiator 14 so as to return toward the container 12.

Specific embodiments of the reflectors 16 are not particularly limited as long as the electromagnetic wave can be reflected toward the inside of the container 12, and examples thereof include a mirror, a metal plate having a mirror-finished surface and the like.

The reflector 16 may be positioned to reflect the electromagnetic wave to reach the inside of the container 12. Although the specific embodiment for that is not particularly limited, in this embodiment, as can be seen from FIG. 6 and FIG. 9, the reflector 16 is disposed at each of the positions opposite to each of the electromagnetic wave irradiators 14 across the axis of the container 12 outside of the container 12. Thus, it is possible to reflect the electromagnetic wave reaching from the electromagnetic wave irradiator 14 to efficiently return to the container 12 with the reflector 16. Therefore, in this embodiment, as can be seen from FIG. 9, the reflectors 16 are disposed in the upper half of the outer periphery of the container 12. However, the reflector 16 need not be disposed when the electromagnetic wave irradiator 14 is disposed instead of the reflector 16.

Although it is not always necessary to dispose the reflector 16 when the electromagnetic wave irradiators 14 are disposed over the entire outer periphery of the container 12, from the viewpoint of handling of the container 12 during replacement of the container 12, efficient use of energy, and a reduction in facility cost, it is preferred to reduce the number of electromagnetic wave irradiators 14, and it is possible to arrange the reflector 16 for the reduced part.

3.4. Rotary Shaft

Figure 10:
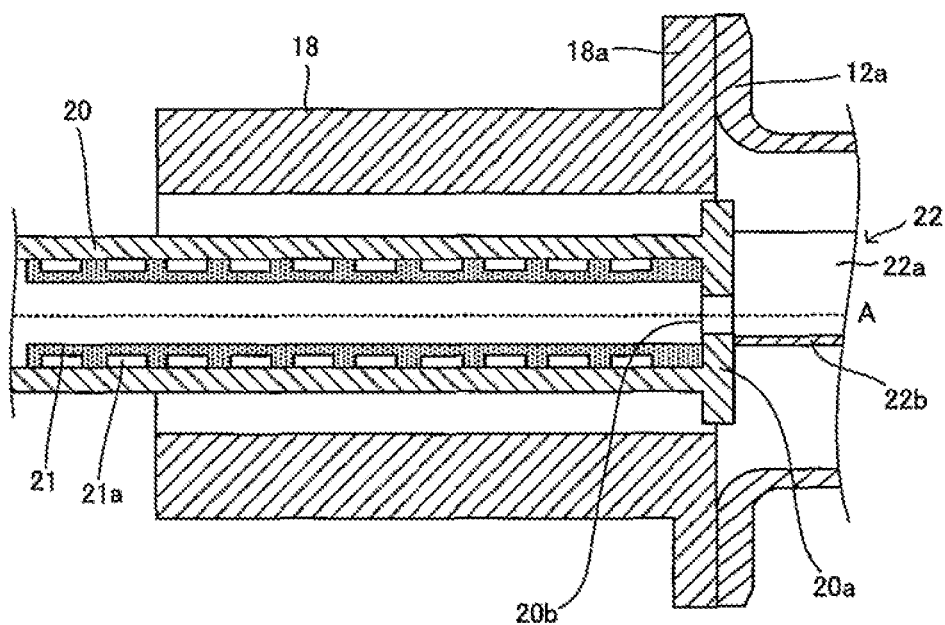
FIG. 10 is an enlarged view of a periphery of a rotary shaft 18 and a suction tube 20 in FIG. 6.

The rotary shaft 18 is a rotary shaft that rotates about its axis, and the rotary shaft 18 is coupled to the container 12 to rotate the container 12. FIG. 10 illustrates an enlarged view of a portion (a portion indicated by X in FIG. 6) including the rotary shaft 18 of FIG. 6. As can be seen from FIG. 6 and FIG. 10, the rotary shaft 18 is a cylindrical shaft member. Further, an outer peripheral end portion on one end side in an axial direction of the rotary shaft 18 is formed so as to increase the outer diameter to make a flange portion 18a.

As can be seen from FIG. 6 and FIG. 10, in this embodiment, the axis of the rotary shaft 18 and the axis of the container 12 as a cylinder are arranged so as to make a straight line in a horizontal direction (the axis A of FIG. 6 and FIG. 10). The flange portion 18a of the rotary shaft 18 and the flange portion 12a of the container 12 are overlapped to be mutually abutted and coupled. The coupling of the flange portion 12a and the flange portion 18a is not particularly limited, and it can be performed by clamping or the like for holding so as to sandwich both flanges from the outer peripheral sides.

Coupling of the rotary shaft 18 and the container 12 allows the container 12 to rotate about the axis A by rotating the rotary shaft 18 about the axis A.

Note that the coupling of the rotary shaft 18 and the container 12 is performed so as to have airtightness. Since vacuum suction is performed to depressurize the inside of the container 12 as described later, the air tightness is kept such that this depressurization is not inhibited. Specific mean for obtaining the airtightness may be performed by placing a seal member, such as an O-ring, at an appropriate position, although not particularly limited.

3.5. Suction Tube

The suction tube 20 is a tubular member, and serves as a conduit for suctioning gas from the inside of the container 12 coupled to the rotary shaft 18 by the suction force of the suction device 24. The embodiment of the suction tube 20 is shown in FIG. 6 and FIG. 10. Although the suction tube is a tubular member as described above, in this embodiment, a bottom portion 20a is provided on one end side thereof (an end portion serving as a container 12 side), and a hole 20b is provided in the bottom portion 20a such that the inside and the outside of the suction tube 20 communicate with each other. However, there is no particular limitation on the specific shape of one end side (the end portion serving as the container 12 side) of the suction tube 20, and it is only necessary that the gas in the container 12 can be suctioned.

As can be seen from FIG. 6 and FIG. 10, the suction tube 20 is disposed coaxially with the rotary shaft 18 in this embodiment, and the suction tube 20 is positioned so as to pass through the inside of the rotary shaft 18, which is cylindrical. At this time, the bottom portion 20a is arranged so as to face the container 12. In this embodiment, as described later, the guest adsorber 22 is attached to the outside of the bottom portion 20a.

Note that the suction tube 20 is provided without rotating by the rotation of the rotary shaft 18. At this time, the airtightness is maintained so as not to communicate with the inside of the container 12 from a space between the suction tube 20 and the rotary shaft 18. Since vacuum suction is performed to depressurize the inside of the container 12 as described later, the air tightness is kept such that this depressurization is not inhibited. Specific means for obtaining the airtightness may be performed by placing a seal member, such as an O-ring, at an appropriate position, although not particularly limited.

In this embodiment, a cooling member 21 is disposed on an inner peripheral surface of the suction tube 20. The cooling member 21 of this embodiment is cylindrical and is positioned along the inner peripheral surface of the suction tube 20. As shown in FIG. 6 and FIG. 10, a flow path 21a is formed in a spiral shape in the cooling member 21, and cooling water which is sent from a cooling water pump (not shown), flows to the flow path 21a.

3.6. Guest Adsorber

Figure 11:
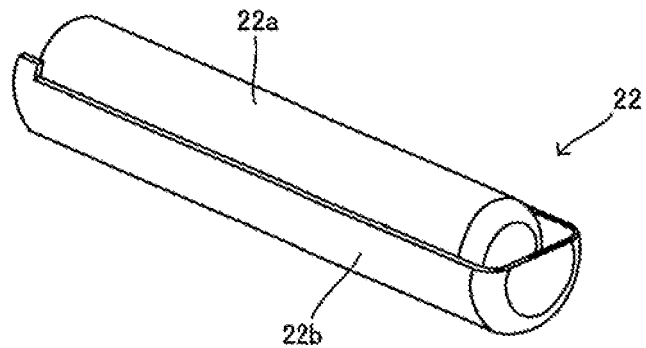
FIG. 11 is an external perspective view of a guest adsorber 22.

The guest adsorber 22 is a member that adsorbs at least a part of the guest (Na in this embodiment) removed from a silicon clathrate compound inside the container 12. FIG. 11 represents an external perspective view of the guest adsorber 22. The end portion in the upper left of FIG. 11 is connected to the suction tube 20 while the lower right of FIG. 11 is a free end side. A part of the guest adsorber 22 is also shown in FIG. 6 and FIG. 10.

As can be seen from these figures, the guest adsorber 22 includes an adsorbent 22a and a receiving container 22b.

The adsorbent 22a includes a material capable of adsorbing the guest (Na in this embodiment). For example, examples of the adsorbent 22a include one in which a material for adsorbing the guest (Na) is stored in a cylindrical member made of a net material. Although the material is not particularly limited as long as it can adsorb the guest, the material may be iron oxide (FeO) when the guest is Na.

The receiving container 22b is a gutter-shaped member, and the adsorbent 22a is arranged inside thereof. Accordingly, the receiving container 22b is configured based on the shape of the adsorbent 22a. The receiving container 22b receives and holds dropped materials for adsorption such that the materials for adsorption falling off from the adsorbent 22a do not become turbid in the silicon clathrate compound stored in the container 12.

In the guest adsorber 22, the receiving container 22b is disposed in the lower side and has a groove of the gutter opened upward in which the adsorbent 22a is disposed, and the guest adsorber 22 is positioned inside the container 12. The guest adsorber 22 is arranged such that one end of the receiving container 22b is secured to the outside of the bottom portion 20a of the suction tube 20 described above, and the other end side (the free end side) of the receiving container 22b extends toward the inside of the container 12.

Use of the guest adsorber 22 allows reducing the amount of the guests contained in the gas to be suctioned when the gas inside the container 12 is suctioned by the suction device 24, thus ensuring the suppressed occurrence of a failure in the apparatus due to the guest. Therefore, it is not necessary to use the guest adsorber 22 if there is no problem even when a large amount of removed guests is contained in the gas to be suctioned due to the nature of the guest.

3.7. Suction Device

The suction device 24 is means for suctioning gas from the inside of the container 12 through the suction tube 20. Accordingly, the suction device 24 is coupled to an end portion (an end portion opposite to the end portion on the container 12 side) of the suction tube 20.

Although there is no particular limitation on the specific embodiment of the suction device 24 as long as the suction can be performed, for example, a vacuum pump may be used.

Figure 12:
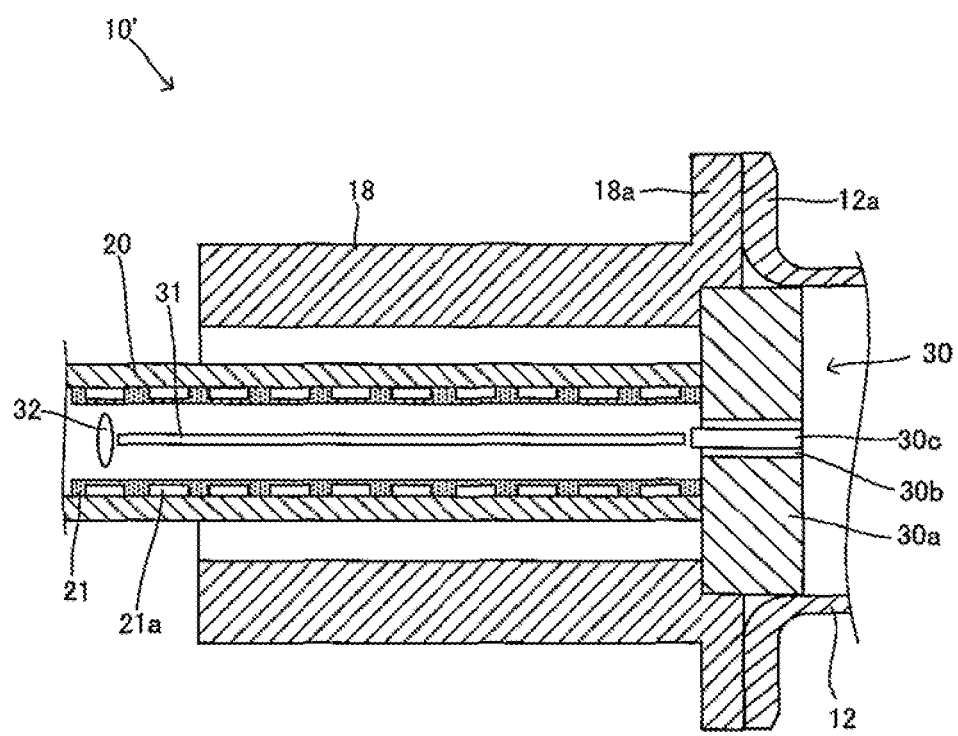
FIG. 12 is a diagram illustrating a configuration of a producing apparatus 10' for a guest-free silicon clathrate.
Figure 13:
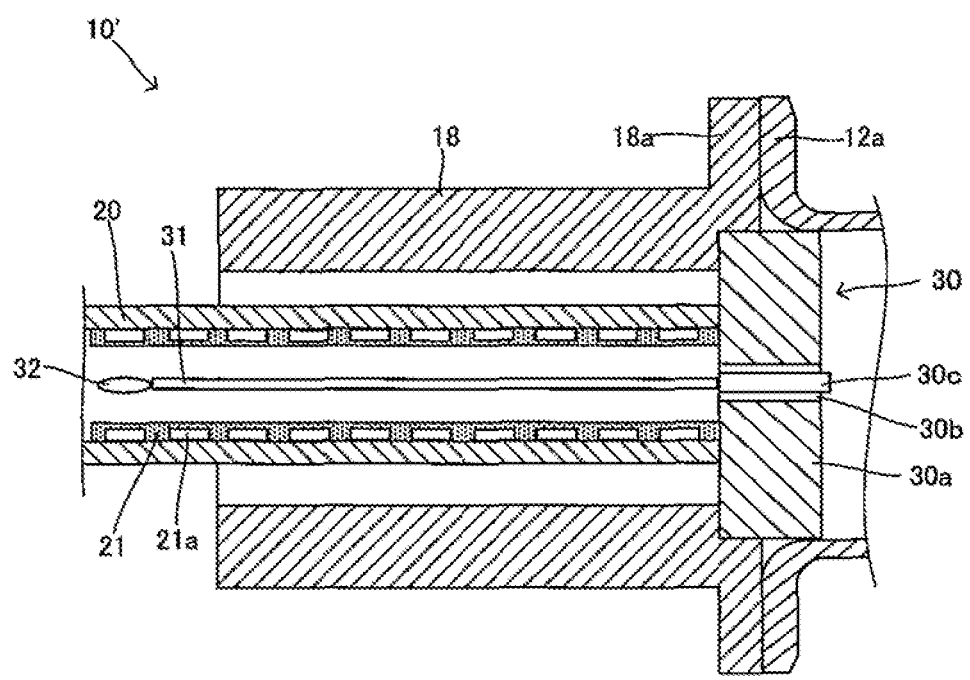
FIG. 13 is a diagram illustrating a configuration of the producing apparatus 10' for a guest-free silicon clathrate.

4. Other Embodiments of an Apparatus for Producing a Guest-Free Silicon Clathrate FIG. 12 and FIG. 13 show a diagram illustrating a guest-free silicon clathrate producing apparatus 10' (hereinafter sometimes described as "producing apparatus 10'") according to another embodiment. FIG. 12 and FIG. 13 are views according to the same perspective as FIG. 10.

The producing apparatus 10' includes, in addition to the producing apparatus 10, a valved lid 30, a push rod 31, and a cam 32. Since other parts can be considered in the same manner as in the producing apparatus 10, the same reference numerals will be given and description thereof will be omitted. However, in this embodiment, it is assumed that the suction tube 20 does not have the bottom portion 20a and does not include the guest adsorber 22.

The valved lid 30 is a lid member disposed so as to block the opening of the container 12. In addition, the valved lid 30 has a valve 30c. The valve 30c provided in the valved lid 30 of this embodiment is disposed inside a hole 30b provided in a main body 30a of the valved lid 30. The gas communication between the inside and the outside of the container 12 normally through the hole 30b is prohibited (the airtight state is maintained) by the urging force of a spring (not shown). The gas communication through the hole 30b is permitted (the airtight state is released) by pushing the valve 30c toward the container 12 side against the urging force of the spring (not shown).

The push rod 31 is a rod-like member and is disposed inside the suction tube 20 along the axis of the suction tube 20. The end portion of the push rod 31 on the container 12 side is disposed so as to face the valve 30c of the valved lid 30.

The cam 32 is a cam disposed so as to be contactable with the end portion opposite to the end portion of the push rod 31 on the container 12 side, and it is possible to move the push rod 31 toward the valved lid 30 by its posture. There is no particular limitation on the specific embodiment of the cam 32, a known embodiment can be applied, and examples thereof include an eccentric rotator and an elliptical one. Further, a change in the posture of the cam 32 is performed by a control device (not shown).

According to the producing apparatus 10', when the push rod 31 does not push the valve 30c by the posture of the cam 32 as shown in FIG. 12, the gas communication between the inside and the outside of the container 12 through the hole 30b is prohibited (the airtight state is maintained). On the other hand, as shown in FIG. 13, when the push rod 31 moves by the change of the posture of the cam 32 due to rotation of the cam 32 or the like and pushes the valve 30c, the gas communication through the hole 30b is permitted (the airtight state is released).

With the producing apparatus 10', as shown in FIG. 12, when the container 12 is attached to and detached from the rotary shaft 18, the push rod 31 is kept in a state in which the push rod 31 does not push the valve 30c. Thus, since the gas communication between the inside and the outside of the container 12 is prohibited (the airtight state is maintained), it is possible to more reliably prevent the inflow of outside air into the container 12.

On the other hand, after the container 12 is coupled to the rotary shaft 18, as shown in FIG. 13, the push rod 31 pushes the valve 30c by the movement of the push rod 31 by the change of the posture of the cam 32, thus allowing the gas communication through the hole 30b (the airtight state is released). This allows the producing apparatus 10' to act in the same manner as the producing apparatus 10.

5. Method of Producing a Guest-Free Silicon Clathrate

Hereinafter, a guest-free silicon clathrate producing method for guest removal in Step S30 (hereinafter sometimes referred to as "producing method of this embodiment") will be described. Here, description will be given by an example using the producing apparatus 10 for clarity, but the present invention is not limited thereto, and the producing method of this embodiment may be performed using other producing apparatuses.

Figure 14:
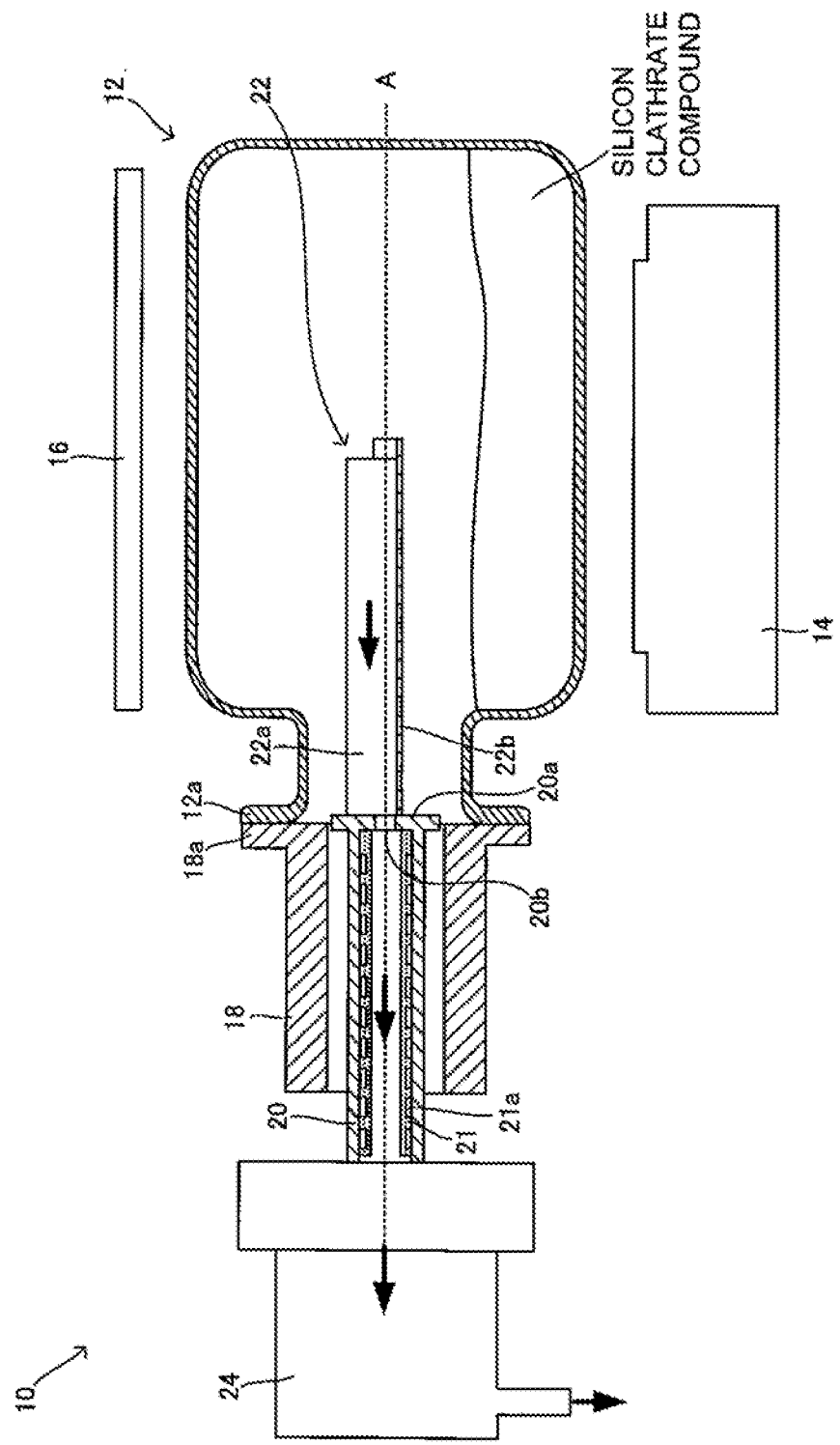
FIG. 14 is a diagram illustrating Step S30 of guest removal.
Figure 15:
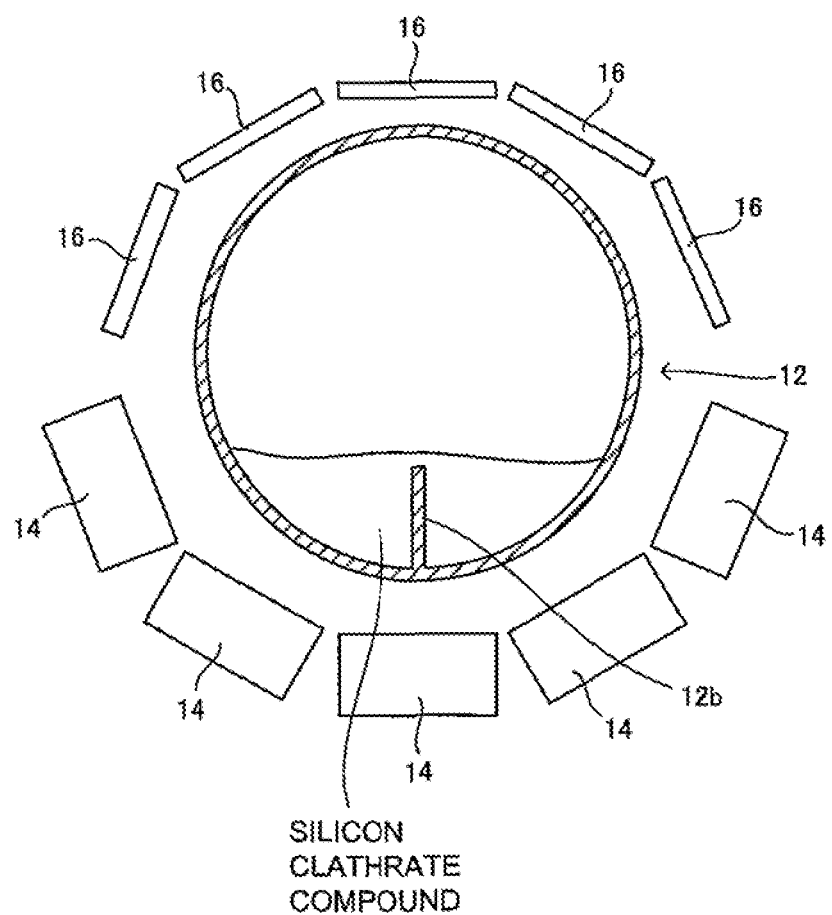
FIG. 15 is a diagram illustrating Step S30 of guest removal.

Initially, the container 12 storing a silicon clathrate is coupled to the rotary shaft 18. The embodiment of the coupling is as described above. FIG. 14 and FIG. 15 show views of a state in which the container 12 storing the silicon clathrate is coupled to the rotary shaft 18. FIG. 14 and FIG. 15 are views according to the same perspectives as FIG. 6 and FIG. 9, respectively.

Thereafter, the suction device 24 is activated to perform the first vacuum suction. When the suction device 24 is activated, the gas inside the container 12 is suctioned as indicated by the straight arrow in FIG. 14, and the gas is discharged through the adsorbent 22a of the guest adsorber 22 and the suction tube 20. Thus, the inside of the container 12 is depressurized to be in a state in which the pressure is lower than atmospheric pressure (although not in a complete vacuum state, it becomes a depressurized state achievable by a normal vacuum pump).

After the state is achieved, the producing method of this embodiment further performs heating, stirring, and suction. The description will be given below.

5.1. Heating

Heating is performed by the electromagnetic wave irradiators 14 and the reflectors 16 disposed along the outer periphery of the container 12. In other words, the electromagnetic wave irradiators 14 are activated to irradiate the silicon clathrate compound stored inside the container 12 with the electromagnetic wave. Further, the electromagnetic wave transmitted from the opposite side of the container 12 is reflected by the reflectors 16 and returned to the container 12, and the silicon clathrate compound is irradiated.

In this disclosure, since the silicon clathrate compound is heated by irradiating with the electromagnetic wave in this manner, the silicon clathrate compound can be heated and the temperature of the compound can be raised efficiently even in a depressurized state in which the media for transferring heat is reduced in the container. The heating and rising temperature remove the guest (Na in this embodiment) from the silicon clathrate compound and the guest is released as gas into the container 12.

5.2. Stirring

Figure 16:
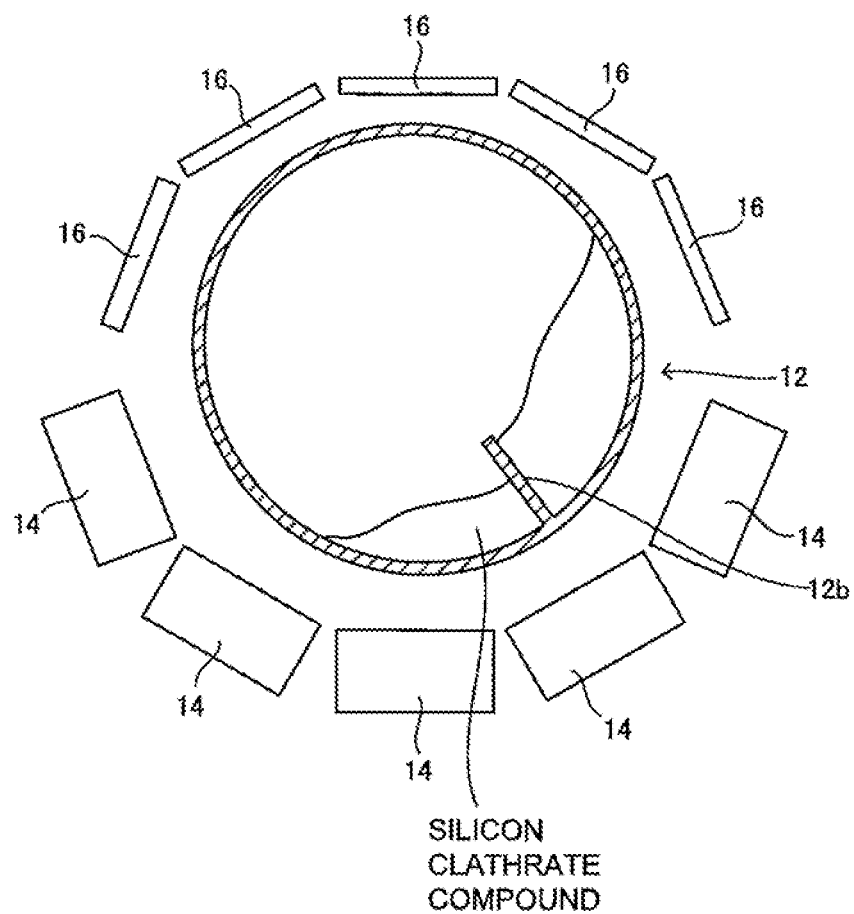
FIG. 16 is a diagram illustrating rotation of the container 12 in Step S30 of guest removal.
Figure 17:
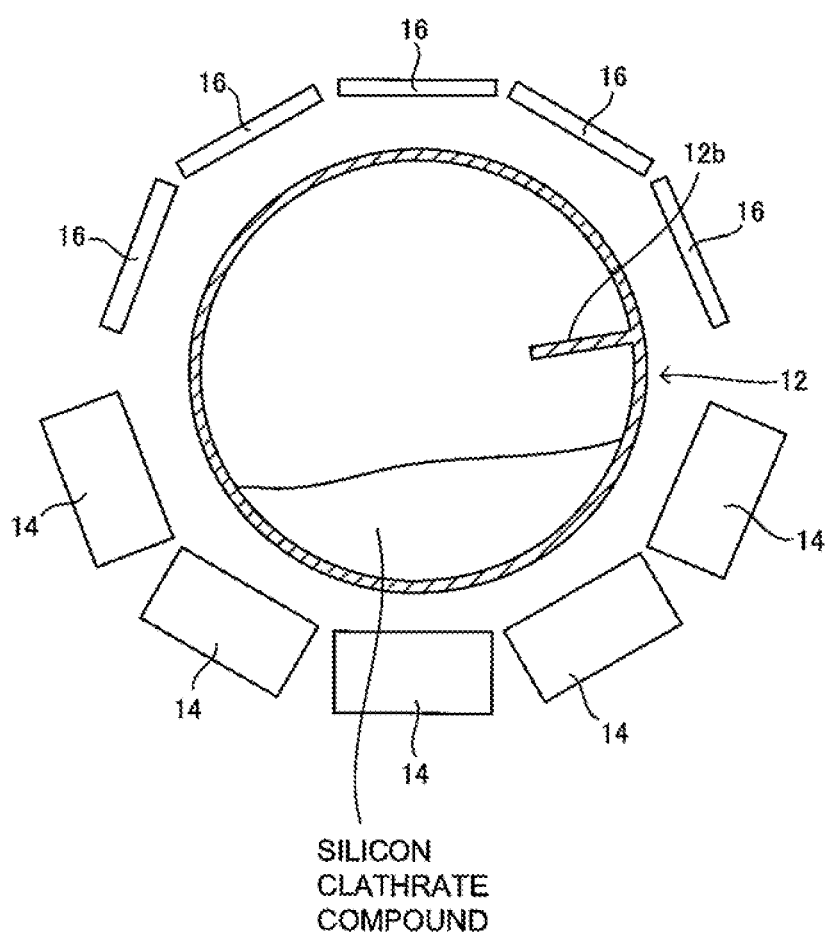
FIG. 17 is a diagram illustrating the rotation of the container 12 in Step S30 of guest removal.

Rotating the rotary shaft 18 about the axis rotates the container 12 about the axis to perform stirring. FIG. 16 and FIG. 17 show illustrative views. FIG. 16 and FIG. 17 are views according to the same perspective as FIG. 15.

Since the container 12 of this embodiment includes the stirring plate 12b, repeating the states in FIG. 15 to FIG. 17 by the rotation of the container 12 stirs the silicon clathrate compound to perform the heating with high uniformity, thus more smoothly performing the guest removal.

As can be seen from FIG. 15 to FIG. 17, the position of the silicon clathrate compound changes with the rotation of the container 12, but even when the position changes, the electromagnetic wave irradiators 14 and the reflectors 16 are disposed along the outer periphery of the container 12 so that the silicon clathrate compound can be heated with high uniformity regardless of the change in position.

5.3. Suction

When the guest (Na in this embodiment) is removed from the silicon clathrate by the heating, the guest exists as gas inside the container 12. As the concentration of this gas increases, the processing speed of guest removal decreases, resulting in a decrease in efficiency. Therefore, in the producing method of this embodiment, the gas inside the container is suctioned while the heating and the stirring are performed.

This suction is similar to the first vacuum suction described above. That is, when the vacuum suction is performed by activating the suction device 24, the gas inside the container 12 is suctioned as shown by the straight arrow in FIG. 14, and the gas is discharged through the adsorbent 22a of the guest adsorber 22 and the suction tube 20. However, a large amount of guests is contained in the gas suctioned by this suction. Accordingly, the suctioning can suppress filling the inside of the container 12 with the guests and lowering the processing speed, thereby enabling progress of an efficient process.

When the gas containing a large amount of guests to be suctioned causes a failure of the apparatus, it is effective to dispose the cooling member 21 on an inner wall of the guest adsorber 22 and the suction tube 20 as in this embodiment.

It is possible to reduce the concentration of the guests contained in the gas discharged by adsorbing the guests with the guest adsorber 22.

Further, cooling the suctioned gas by the cooling member 21 allows the guests to adhere to the wall surface of the cooling member 21. This also can reduce the concentration of the guests contained in the discharged gas. The cooling member 21 may be cleaned or replaced as necessary.

5.4. Others

Note that, in order to prevent exposure to the atmosphere when Step S30 is completed, an inert gas, such as Ar, may be filled into the container 12 before removing the container 12 from the rotary shaft 18. At this time, it is possible to more reliably suppress the inflow of the atmosphere into the container by having a slightly higher pressure in the container than the outside pressure. From the viewpoint that it is possible to enhance the sealability in the container during the detachment of the container 12 from the rotary shaft 18 and the coupling of the container 12 to the rotary shaft 18, the valved lid 30, the push rod 31, and the cam 32 can be disposed as in the above-described producing apparatus 10'.

6. Effects and the Like

As described above, it is possible to efficiently perform the removal of the guests by performing the heating by the electromagnetic wave and the suction on the silicon clathrate compound in the container together, thereby enhancing the productivity of the production of the guest-free silicon clathrate. The stirring of the silicon clathrate compound by the rotation of the container further increases the efficiency.

DESCRIPTION OF SYMBOLS

1 Guest-free silicon clathrate
2 Guest removed site
3 Void
10, 10' Guest-free silicon clathrate producing apparatus
12 Container
14 Electromagnetic wave irradiator
16 Reflector
18 Rotary shaft
20 Suction tube
22 Adsorber
24 Suction device
30 Valved lid
31 Push rod
32 Cam

The invention claimed is:

1. A method of producing a guest-free silicon clathrate, comprising:
   a synthesizing step of performing a heat treatment on a mixture containing Si as a material serving as a host and a material serving as a guest to synthesize a silicon clathrate compound;
   a stirring step of stirring the silicon clathrate compound contained in a container, performed by using a protrusion on an inner wall surface of the container;
   a guest removing step of irradiating the silicon clathrate compound contained in the container with an electromagnetic wave from an outside of the container to remove the guest while suctioning gas inside the container and while rotating the container, wherein the container is made of transparent quartz glass; and
   an adsorbing step of adsorbing the removed guest using a cooling member and an adsorbent.

2. The method of producing a guest-free silicon clathrate according to claim 1, further comprising:
   mixing the silicon clathrate compound and a Li source after the synthesizing step and synthesizing a silicon clathrate compound containing Li;
   forming voids by removing Li from the silicon clathrate compound containing Li to obtain a silicon clathrate compound having the voids; and
   performing the guest removing step on the silicon clathrate compound having the voids.

* * * * *